US012689057B2

(12) United States Patent
Terada et al.

(10) Patent No.: US 12,689,057 B2
(45) Date of Patent: Jul. 21, 2026

(54) LITHIUM SECONDARY BATTERY

(71) Applicant: Panasonic Intellectual Property Management Co., Ltd., Osaka (JP)

(72) Inventors: Shoshi Terada, Osaka Fu (JP); Akira Kano, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 575 days.

(21) Appl. No.: 18/028,886

(22) PCT Filed: Aug. 18, 2021

(86) PCT No.: PCT/JP2021/030125
§ 371 (c)(1),
(2) Date: Mar. 28, 2023

(87) PCT Pub. No.: WO2022/070646
PCT Pub. Date: Apr. 7, 2022

(65) Prior Publication Data
US 2023/0335783 A1      Oct. 19, 2023

(30) Foreign Application Priority Data
Sep. 30, 2020      (JP) ................................. 2020-165121

(51) Int. Cl.
| | |
|---|---|
| *H01M 10/052* | (2010.01) |
| *H01M 4/13* | (2010.01) |
| *H01M 10/0567* | (2010.01) |
| *H01M 10/0569* | (2010.01) |

(52) U.S. Cl.
CPC ........... *H01M 10/052* (2013.01); *H01M 4/13* (2013.01); *H01M 10/0567* (2013.01); *H01M 10/0569* (2013.01)

(58) Field of Classification Search
CPC .. H01M 10/052; H01M 10/0567; H01M 4/13; H01M 4/131; H01M 4/505; H01M 4/525; H01M 2004/028; H01M 2300/0025; H01M 2300/0034; Y02E 60/10
See application file for complete search history.

(56) References Cited

U.S. PATENT DOCUMENTS

| | | | |
|---|---|---|---|
| 2013/0224606 A1 | 8/2013 | Koh et al. | |
| 2014/0017560 A1 | 1/2014 | Sakata et al. | |
| 2014/0029165 A1 | 1/2014 | Takahashi et al. | |
| 2014/0322616 A1 | 10/2014 | Onozaki et al. | |
| 2019/0379035 A1 | 12/2019 | Suzuki et al. | |
| 2021/0057721 A1 | 2/2021 | Kawasaki et al. | |
| 2022/0344699 A1* | 10/2022 | Hojo ..................... | H01M 4/587 |

FOREIGN PATENT DOCUMENTS

| | | |
|---|---|---|
| CN | 110581306 A | 12/2019 |
| CN | 111261943 A | 6/2020 |
| EP | 2631980 A1 | 8/2013 |
| JP | 2003-317692 A | 11/2003 |
| JP | 2014-072102 A | 4/2014 |
| WO | 2012/133698 A1 | 10/2012 |
| WO | 2012/133701 A1 | 10/2012 |
| WO | 2014/065246 A1 | 5/2014 |
| WO | 2016/129602 A1 | 8/2016 |
| WO | 2019/107242 A1 | 6/2019 |

OTHER PUBLICATIONS

Extended (Supplementary) European Search Report dated Feb. 26, 2024, issued in counterpart EP Application No. 21874949.7. (6 pages).
International Search Report dated Oct. 19, 2021, issued in counterpart Application No. PCT/JP2021/030125, with English translation. (5 pages).
Written Opinion dated Oct. 19, 2021, issued in counterpart Application No. PCT/JP2021/030125. (3 pages).
Office Action dated Aug. 5, 2025, issued in counterpart JP Application No. 2022-553529. (4 pages).
Office Action dated Nov. 26, 2025, issued in counterpart CN Application No. 202180066694.7, with partial English translation. (8 pages).

* cited by examiner

*Primary Examiner* — Aiqun Li
(74) *Attorney, Agent, or Firm* — WHDA, LLP

(57) ABSTRACT

A lithium secondary battery includes a positive electrode, a negative electrode, a separator interposed between the positive electrode and the negative electrode, and a non-aqueous electrolyte, wherein the non-aqueous electrolyte includes a fluorinated vinylene ether compound A having a —CF=CH—O— bond, and a non-aqueous solvent.

4 Claims, No Drawings

LITHIUM SECONDARY BATTERY

CROSS-REFERENCE TO RELATED APPLICATION

This application is a National Phase Application filed under 35 U.S.C. § 371 of International Application No. PCT/JP2021/030125 filed on Aug. 18, 2021, which claims the benefit of priorities under 35 U.S.C. § 119 (a) of Japanese Patent Application No. 2020-165121 filed in Japan on Sep. 30, 2020, the contents of which are incorporated herein by reference.

TECHNICAL FIELD

The present disclosure relates to a lithium secondary battery.

BACKGROUND ART

Lithium ion secondary batteries are expected as a power source for small consumer applications, power storage devices, and electric vehicles, because of their high output and high energy density.

Patent Literature 1 discloses a lithium secondary battery with a high energy density, excellent cycle characteristics, and in which electrolyte propagation is not caused easily. The lithium secondary battery includes an electrolyte including 60 vol % or more and 99 vol % or less of a phosphate compound, 0 vol % or more 30 vol % or less of a fluorinated ether compound, and 1 vol % or more and 35 vol % or less of a fluorinated carbonate compound, and a total of the phosphate compound and fluorinated ether compound is 65 vol % or more.

CITATION LIST

Patent Literature

PLT1: WO2019/107242

SUMMARY OF INVENTION

With the lithium secondary battery disclosed in Patent Literature 1, improvement in decrease in discharge capacity when charge/discharge cycles are repeated is insufficient.

A lithium secondary battery of the present disclosure includes a positive electrode, a negative electrode, a separator interposed between the positive electrode and the negative electrode, and a non-aqueous electrolyte, wherein the non-aqueous electrolyte includes a fluorinated vinylene ether compound A having a —CF=CH—O— bond, and a non-aqueous solvent.

With the present disclosure, charge/discharge cycle characteristics of lithium secondary batteries can be improved.

DESCRIPTION OF EMBODIMENTS

The lithium secondary battery of the present disclosure includes a positive electrode, a negative electrode, and a separator disposed between the positive electrode and negative electrode, and a non-aqueous electrolyte.

In lithium secondary batteries, side reactions of the negative electrode surface and the non-aqueous electrolyte may occur in the negative electrode. This may reduce battery charge/discharge cycle characteristics.

The non-aqueous electrolyte includes a fluorinated vinylene ether compound A having a —CF=CH—O— bond and a non-aqueous solvent.

When the non-aqueous electrolyte includes the fluorinated vinylene ether compound A, the fluorinated vinylene ether compound A in the non-aqueous electrolyte reacts and polymerizes at an initial stage of charging at the negative electrode surface, and may form an excellent coating on the negative electrode surface. Therefore, an excellent coating derived from the fluorinated vinylene ether compound A suppresses side reactions between the non-aqueous electrolyte and the negative electrode surface, and improves charge/discharge cycle characteristics.

The fluorinated vinylene ether compound A may be a compound having a —CF=CH—O— bond, and is preferably $R_{41}$—CF=CH—O—$R_{42}$ (where, $R_{41}$ and $R_{42}$ are each a hydrogen atom, an alkyl group, a halogenated alkyl group, a halogen atom, an alkenyl group, a halogenated alkenyl group, a cyano group, an amino group, a nitro group, an alkoxy group, a halogenated alkoxy group, a cycloalkyl group, a halogenated cycloalkyl group, or a silyl group). Preferably, in view of easily forming a coating derived from the fluorinated vinylene ether compound A at the negative electrode surface, at least one of $CF_2$=CH—O—$CF_2$—$CF_2H$, $CF_3$—CF=CH—O—$CF_2$—$CF_2H$, $CF_2H$—CF=CH—O—$CF_2$—$CF_2H$, $CF_2$=CH—O—$CF_2$—$CF_3$ is preferably included in the compound A, and at least $CF_2$=CH—O—$CF_2H$ is included.

The amount of fluorinated vinylene ether compound A included in the non-aqueous electrolyte may be 5 ppm or more relative to a total amount of the non-aqueous electrolyte. In view of easily forming a coating derived from the fluorinated vinylene ether compound A on the negative electrode surface, it may be 10 ppm or more, 50 ppm or more, or 100 ppm or more. There is no limitation on the upper limit of the fluorinated vinylene ether compound A, and it may be preferably 1500 ppm or less, 1000 ppm or less, 500 ppm or less, or 250 ppm or less.

When the fluorinated vinylene ether compound A is used in the above-described range, the effects of suppressing formation of a coating derived from a decomposition product of the non-aqueous electrolyte can be achieved significantly. However, in batteries, the fluorinated vinylene ether compound A is consumed for use for reaction and polymerization at the negative electrode surface from the initial stage of charging, and when analyzing the non-aqueous electrolyte taken out from the battery, the fluorinated vinylene ether compound A content may be less than 5 ppm. Meanwhile, the fluorinated vinylene ether compound A is rarely consumed completely. In view of achieving the effects of the present disclosure, the non-aqueous electrolyte taken out from the battery should includes the fluorinated vinylene ether compound A of the detection limit or more.

The non-aqueous solvent included in the non-aqueous electrolyte preferably includes an ether compound X different from the fluorinated vinylene ether compound A. The ether compound X hardly causes side reactions with the negative electrode surface. The ether compound X may be, for example, 50 vol % or more, 60 vol % or more, 70 vol % or more, or 90 vol % or more of the entire non-aqueous solvent, or the non-aqueous solvent may be entirely the ether compound X.

In the non-aqueous electrolyte, the content of the components is determined by, for example, using high-performance liquid chromatography, gas chromatography-mass spectrometry (GC-MS), nuclear magnetic resonance (NMR), inductively coupled plasma spectrometry (ICP-MS), elemental analysis, and the like.

The ether compound X may be, for example, an alkyl ether compound Y represented by $R_1$—$(OCH_2CH_2)_n$—$OR_2$. $R_1$ and $R_2$ are each an alkyl group with a number of carbon atoms of 1 to 5, and preferably, an alkyl group with a number of carbon atoms of 1 to 2. "n" is preferably 1 to 4, more preferably 1 to 2. By using the alkyl ether compound Y as a main component of the non-aqueous solvent, lithium salt solubility in the non-aqueous electrolyte is increased, and a high flowability and high lithium ion conductivity of the non-aqueous electrolyte are ensured.

The main component of the non-aqueous solvent is, for example, a component with 20 vol % or more of the non-aqueous solvent. The alkyl ether compound Y may be, for example, 20 vol % or more and 80 vol % or less of the non-aqueous solvent.

Examples of the alkyl ether compound Y include tetrahydrofuran, 1,2-dimethoxyethane (DME), 1,2-diethoxyethane, 1,2-dibutoxyethane, diethyleneglycol dimethylether, diethyleneglycol diethylether, diethyleneglycol ethylmethylether, diethyleneglycol dibutylether, triethyleneglycol dimethylether, and tetraethyleneglycol dimethylether. A kind of alkyl ether compound Y may be used singly, or two or more kinds thereof may be used in combination.

For the ether compound X, a saturated hydrofluoro ether compound Z represented by $(C_{x1}H_{y1}F_{z1})$—O—$(C_{x2}H_{y2}F_{z2})$ may be used. Here, x1, x2, z1 are an integer of 1 or more, y1, y2, z2 are an integer of 0 or more, and $x1+x2 \leq 10$, $1 \leq y1+y2$ are satisfied. The saturated hydrofluoro ether compound Z may be, for example, 20 vol % or more and 80 vol % or less of the non-aqueous solvent.

The saturated hydrofluoro ether compound Z may have a fluorinated rate of 60% or more, 80% or more, or 100%. The fluorinated rate of the saturated hydrofluoro ether compound Z is the ratio of the number of the fluorine atom relative to the number of the fluorine atom and hydrogen atom in total in the saturated hydrofluoro ether compound Z represented by percentage (%).

By using the saturated hydrofluoro ether compound Z, a coating derived from the fluorinated vinylene ether compound A is formed homogeneously on the negative electrode surface, and the effects of improvement in charge/discharge cycle characteristics can be achieved even more. Although the mechanism is not clear, the fluorinated vinylene ether compound A and saturated hydrofluoro ether compound Z are both a fluorinated ether compound and therefore has a high compatibility, compared with a mixture solution of the non-fluorinated ether compound and fluorinated vinylene ether compound A, so that the fluorinated vinylene ether compound A tends to disperse homogeneously in the non-aqueous electrolyte. Therefore, by mixing the saturated hydrofluoro ether compound Z with fluorinated vinylene ether compound A, when the fluorinated vinylene ether compound A reacts and polymerizes at the negative electrode surface, reactions progress more homogeneously and an excellent coating is formed.

Specific examples of the saturated hydrofluoro ether compound Z include 1,1,2,2-tetrafluoroethyl 2,2,2-trifluoroethyl ether, and 1,1,2,2-tetrafluoroethyl 2,2,3,3-tetrafluoropropyl ether. A kind of fluoro ether compound may be used singly, or two or more kinds thereof may be used in combination.

In the following, the lithium secondary battery of the present disclosure is described in more detail element by element.

(Positive Electrode)

The positive electrode includes a positive electrode active material. The positive electrode generally includes a positive electrode current collector, and a positive electrode mixture supported on the positive electrode current collector. The positive electrode mixture may contain the positive electrode active material as an essential component, and may contain a binder, a thickener, and a conductive agent as optional components. The positive electrode includes, generally, a layered positive electrode mixture (hereinafter, referred to as a positive electrode mixture layer) supported on the positive electrode current collector. The positive electrode mixture layer can be formed by applying a positive electrode slurry in which the components of the positive electrode mixture are dispersed in a dispersion medium on a surface of the positive electrode current collector, and drying the slurry. The dried coating film may be rolled, if necessary.

For the positive electrode active material, for example, a lithium transition metal composite oxide having a layered rock salt type structure is used. In particular, by using, for example, a lithium transition metal composite oxide including Ni and at least one of Co, Al, and Mn for the main component of the positive electrode active material, a high capacity and a high voltage can be brought out.

The main component of the positive electrode active material is, for example, a component that occupies of 50 mass % or more of the positive electrode active material. The above lithium transition metal composite oxide occupies, for example, preferably 50 mass % or more, more preferably 70 mass % or more, or even more preferably 90 mass % or more of the positive electrode active material.

The lithium transition metal composite oxide used for the positive electrode active material preferably includes a lithium transition metal oxide A represented by $Li_\alpha Ni_{1-a1-a2-a3-b}Co_{a1}Mn_{a2}Al_{a3}M_bO_{2+\beta}$. Here, $0.95 \leq \alpha \leq 1.05$, $0.8 \leq 1-a1-a2-a3-b \leq 0.99$, $0 \leq a1 \leq 0.1$, $0 \leq a2 \leq 0.1$, $0 \leq a3 \leq 0.1$, $0 \leq b \leq 0.1$, $-0.05 \leq \beta \leq 0.05$, and M is at least one selected from the group consisting of Ti, Zr, Nb, Mo, W, Fe, Zn, B, Si, Mg, Ca, Sr, and Y. The lithium transition metal oxide A has a particularly high capacity among lithium transition metal oxides.

"a3" representing the ratio of Al (atomic ratio) preferably satisfies $0 < a3 \leq 0.1$, or $0.01 \leq a3 \leq 0.1$ in view of thermal stability and durability.

"a1" representing the ratio of Co (atomic ratio) preferably satisfies $0 < a1 \leq 0.1$, or $0.01 \leq a1 \leq 0.1$ in view of output characteristics and durability.

(1-a1-a2-a3-b) representing the ratio of Ni (atomic ratio) preferably satisfies $0.8 < 1-a1-a2-a3-b \leq 0.99$, or $0.9 < 1-a1-a2-a3-b \leq 0.95$ in view of high capacity and stability.

With a high Ni ratio, many lithium ions can be taken from the lithium transition metal composite oxide during charging, which allows for a high capacity. However, with a high Ni ratio, the structure of the lithium transition metal oxide becomes unstable. Therefore, side reactions with the non-aqueous electrolyte easily occur at the particle surface of the lithium transition metal oxide. As a result, decomposition products from side reactions of the particle surface of the lithium transition metal oxide and the non-aqueous electrolyte further go through side reactions with the negative electrode, which reduce charge/discharge cycle characteristics of the lithium secondary battery. With a lithium secondary battery of the present disclosure, the non-aqueous electrolyte includes the fluorinated vinylene ether compound A, and therefore by forming an excellent coating on the negative electrode surface, side reactions can be suppressed between the negative electrode surface and decomposition products from side reactions from the lithium transition metal composite oxide particle surface and non-aqueous electrolyte. As a result, excellent cycle characteristics can be ensured.

For the material of the positive electrode current collector, for example, foil of metals such as stainless steel, aluminum, aluminum alloy, and titanium, and a film with such a metal disposed on the surface layer thereof can be used. The positive electrode current collector may further include a protection layer including inorganic particles and a binder.

Examples of the conductive agent include carbon powders such as carbon black, acetylene black, Ketjen Black, graphite, carbon nanotube, and the like. These may be used singly, or two or more kinds thereof may be used in combination.

Examples of the binder include fluorine resin (e.g., polytetrafluoroethylene, polyvinylidene fluoride), polyolefin resin (e.g., polyethylene, polypropylene), polyamide resin (e.g., aramid resin), polyimide resin (e.g., polyimide, polyamide-imide), acrylic resin (e.g., polyacrylic acid, polymethacrylic acid, acrylic acid-methacrylic acid copolymer, ethylene-acrylic acid copolymer, or a salt thereof), vinyl resin (e.g., polyvinyl acetate), and rubber material (e.g., styrene-butadiene rubber (SBR)).

Examples of the thickener include cellulose derivatives such as cellulose ether. Examples of the cellulose derivative include carboxymethyl cellulose (CMC) and a modified product thereof, and methylcellulose. The modified CMC includes also CMC salt. Examples of the salt include alkali metal salt (e.g., sodium salt), and ammonium salt.

For the dispersion medium of the positive electrode slurry, for example, N-methyl-2-pyrrolidone (NMP) is used.

In view of obtaining a high capacity battery, the positive electrode mixture layer may have a density of 2.5 g/cc or more, or 3.0 g/cc or more. On the positive electrode mixture layer, a protection layer including inorganic particles and a binder may be formed.

(Negative Electrode)

The negative electrode includes a negative electrode current collector. The shape and thickness of the negative electrode current collector can be selected from the shapes and ranges according to the positive electrode current collector. For the material of the negative electrode current collector (metal foil), stainless steel, nickel, nickel alloy, copper, copper alloy, or the like can be exemplified.

The negative electrode may further include a negative electrode mixture supported on the negative electrode current collector. The negative electrode mixture may contain the negative electrode active material as an essential component, and may contain a binder, a thickener, and a conductive agent as optional components. The negative electrode may include a layered negative electrode mixture (hereinafter, referred to as negative electrode mixture layer) supported on the negative electrode current collector. The negative electrode mixture layer can be formed by applying a negative electrode slurry in which the components of the negative electrode mixture are dispersed in a dispersion medium on a surface of the negative electrode current collector, and drying the slurry. The dried coating film may be rolled, if necessary. As the dispersion medium, for example, water or NMP is used.

Examples of the negative electrode active material include a carbon material, a Si-containing material, and a Sn-containing material. The negative electrode may include one type of negative electrode active material, or two or more types can be used in combination. In particular, when the carbon material and Si-containing material are used in combination, the ratio of the carbon material to the total of the Si-containing material and the carbon material is, for example, preferably 80 mass % or more, and more preferably 90 mass % or more.

Examples of the carbon material include graphite, artificial graphite, graphitizable carbon (soft carbon), and non-graphitizable carbon (hard carbon).

Examples of the Si-containing material include Si simple substance, silicon alloy, and silicon compound (silicon oxide, etc.), and a composite material in which silicon particles (fine Si phase) are dispersed in a lithium ion conductive phase (matrix). Examples of the silicon oxide include $SiO_x$ particles. X is, for example $0.5 \leq x < 2$, or may be $0.8 \leq x \leq 1.6$.

Examples of the Sn-containing material include Sn simple substance, and an alloy of silicon and Sn.

For the binder and conductive agent, for example, those exemplified for the positive electrode may be used.

The negative electrode may be a type in which lithium metal deposits on the negative electrode surface during charging and the lithium metal deposited on the negative electrode surface dissolves into the non-aqueous electrolyte during discharging. The type of negative electrode in which lithium metal deposits on the negative electrode surface during charging is advantageous for a high capacity battery, but deposits of dendritic lithium may be generated on the negative electrode during charging. When the lithium metal deposits as dendrites at the negative electrode, the specific surface area of lithium metal increases. Therefore, side reactions between lithium metal and the non-aqueous electrolyte increases even more. As a result, decrease in the discharge capacity becomes more significant, and cycle characteristics tend to decrease easily. With the lithium secondary battery of the present disclosure, even using the type of negative electrode in which lithium metal deposits on the negative electrode surface, the fluorinated vinylene ether compound A included in the non-aqueous electrolyte can form an excellent coating on the lithium metal surface. Lithium metal deposits mainly between the coating and negative electrode current collector, and therefore the coating presses the lithium metal, and suppresses extension of the dendritic deposition. Therefore, when using a type of negative electrode in which lithium metal deposits on the negative electrode surface during charging, the fluorinated vinylene ether compound A suppresses generation of dendritic deposition on the negative electrode surface, and effects of improving charge/discharge cycle characteristics can be achieved significantly.

(Non-Aqueous Electrolyte)

The non-aqueous electrolyte includes non-aqueous liquid electrolytes, gel electrolytes, and solid electrolytes, and excludes an aqueous solution electrolyte. The gel electrolyte and solid electrolyte may be an electrolyte with no flowability, in which a non-aqueous electrolyte and a gelling agent or a matrix are formed into a composite.

The non-aqueous electrolyte includes the fluorinated vinylene ether compound A and the non-aqueous solvent. For example, the non-aqueous electrolyte includes the fluorinated vinylene ether compound A, non-aqueous solvent, and a lithium salt dissolved in the non-aqueous solvent.

The lithium salt may include, for example, $LiClO_4$, $LiBF_4$, $LiPF_6$, $LiAlCl_4$, $LiSbF_6$, $LiSCN$, $LiCF_3SO_3$, $LiCF_3CO_2$, $LiAsF_6$, $LiB_{10}Cl_{10}$, lithium lower aliphatic carboxylate, lithium borate, imide lithium, and oxalate complex lithium salt. These may be used singly, or two or more kinds thereof may be used in combination.

Examples of the imide lithium include lithium bis(fluorosulfonyl)imide ($LiN(FSO_2)_2$) (hereinafter, referred to as LiFSI), lithium bis(trifluoromethanesulfonyl) imide (LiN ($CF_3SO_2$) ($FSO_2$)), lithium trifluoromethylsulfonyl fluorosulfonyl imide ($LiN(CF_3SO_2)$ ($FSO_2$)), lithium trifluoromethylsulfonyl nonafluorobutylsulfonyl imide ($LiN(CF_3SO_2)$ ($C_4F_9SO_2$)), and lithium bis(pentafluoroethylsulfonyl) imide ($LiN(C_2F_5SO_2)_2$).

Examples of the oxalate complex lithium salt include lithium bis(oxalate)borate ($LiB(C_2O_4)_2$), lithium difluorooxalateborate ($LiBF_2(C_2O_4)$) (hereinafter, referred to as LiFOB), $LiPF_4(C_2O_4)$, and $LiPF_2(C_2O_4)_2$. In particular, LiFOB is preferable in terms of forming a stable coating even under a high temperature on the negative electrode surface.

The non-aqueous electrolyte may have a total lithium salt concentration of, for example, 0.05 mol/L or more and 3 mol/L or less.

For the non-aqueous solvent, the already described ether compound X, or other compound may be used. For example, as at least a portion of the non-aqueous solvent, chain or cyclic ether other than ether compound X, cyclic carbonate, chain carbonate, cyclic carboxylate, chain carboxylate, may be used. Examples of the cyclic carbonate include propylene carbonate (PC), ethylene carbonate (EC), and the like. Examples of the chain carbonate include diethyl carbonate (DEC), ethyl methyl carbonate (EMC), and dimethyl carbonate (DMC). Examples of the cyclic carboxylate include γ-butyrolactone (GBL) and γ-valerolactone (GVL). Examples of the chain carboxylate include methyl formate, ethyl formate, propyl formate, methyl acetate (MA), ethyl acetate, propyl acetate, methyl propionate, ethyl propionate, and propyl propionate.

(Separator)

A separator is preferably interposed between the positive electrode and negative electrode. The separator has excellent ion permeability and suitable mechanical strength and electrically insulating properties. The separator may be, for example, a microporous thin film, a woven fabric, or a nonwoven fabric, or laminates of at least two selected from these can be used. Preferably, the separator material is polyolefin (e.g., polypropylene, polyethylene).

(Other)

In an example structure of the lithium secondary battery, an electrode group and a non-aqueous electrolyte are accommodated in an outer package, and the electrode group has a positive electrode and a negative electrode wound with a separator interposed therebetween. Alternatively, instead of the wound-type electrode group, other forms of electrode groups may be applied, such as a laminated electrode group in which the positive electrode and the negative electrode are laminated with a separator interposed therebetween. The lithium secondary battery may be any shape of, for example, a cylindrical shape, a rectangular shape, a coin-shape, a button shape, or a laminate shape.

EXAMPLES

Hereinafter, the present disclosure will be specifically described based on Examples and Comparative Examples, but the present disclosure is not limited to the following Examples.

Example 1

(1) Production of Positive Electrode 100 parts by mass of the positive electrode active material particles (composition: $LiNi_{0.9}Co_{0.05}Al_{0.05}O_2$), 1 part by mass of acetylene black, 1 part by mass of polyvinylidene fluoride, and a suitable amount of NMP were mixed, thereby producing a positive electrode slurry. Next, the positive electrode slurry was applied to both surfaces of an aluminum foil (positive electrode current collector), and the coating film was dried, and then rolled to prepare a positive electrode having a positive electrode mixture layer (thickness 95 μm, density 3.6 $g/cm^3$) on both surfaces of the aluminum foil.

(2) Production of Negative Electrode

The negative electrode (negative electrode current collector) was made by cutting an electrolytic copper foil (thickness 10 μm) into a predetermined size.

(3) Preparation of Non-Aqueous Electrolyte

To a mixture solution of a non-aqueous solvent including propylene carbonate (PC) and 1,2-dimethoxyethane (DME) as the ether compound X at a volume ratio of 1:2, $CF_2$=CH—O—$CF_2$—$CF_2H$ as the fluorinated vinylene ether compound A was added at a concentration of 50 ppm, and lithium hexaflurophosphate ($LiPF_6$) as the Li salt at a concentration of 1 mol/L, and lithium difluorooxalateborate (LiFOB) at a concentration of 100 mmol/L were dissolved, thereby preparing a non-aqueous electrolyte.

(4) Production of Lithium Secondary Battery

An aluminum-made tab was attached to the positive electrode, and a nickel-made tab was attached to the negative electrode. Then, the positive electrode, negative electrode, and separator were disposed so that the separator was disposed between the positive electrode and negative electrode, and they were wound into a swirl. The wound electrode group was accommodated in a bag type outer case formed of a laminate sheet including an aluminum layer. After injecting the non-aqueous electrolyte into the outer case, the outer case was sealed to obtain a cell A1 of a lithium secondary battery for evaluation.

Example 2

The $CF_2$=CH—O—$CF_2$—$CF_2H$ concentration used in the non-aqueous electrolyte in Example 1 was changed to 100 ppm. Except for this, a cell A2 was produced in the same manner as in Example 1.

Example 3

The $CF_2$=CH—O—$CF_2$—$CF_2H$ concentration used in the non-aqueous electrolyte in Example 1 was changed to 250 ppm. Except for this, a cell A3 was produced in the same manner as in Example 1.

Example 4

The $CF_2$=CH—O—$CF_2$—$CF_2H$ concentration used in the non-aqueous electrolyte in Example 1 was changed to 1000 ppm. Except for this, a cell A4 was produced in the same manner as in Example 1.

Example 5

1,1,2,2-tetrafluoroethyl 2,2,2-trifluoroethyl ether (HFE) was used instead of DME used for the non-aqueous solvent in Example 1. Except for this, a cell A5 was produced in the same manner as in Example 1.

Example 6

$CF_2H$—$CF$=$CH$—$O$—$CF_2$—$CF_2H$ was used instead of $CF_2$=$CH$—$O$—$CF_2$—$CF_2H$ used for the non-aqueous electrolyte in Example 1. Except for this, a cell A6 was produced in the same manner as in Example 1.

Example 7

The following negative electrode was used instead of the negative electrode produced in Example 1. Water was added to the negative electrode mixture and stirred to prepare a negative electrode slurry. A mixture of artificial graphite (average particle size 25 μm), styrene-butadiene rubber (SBR), and sodium carboxymethylcellulose (CMC-Na) was used for the negative electrode mixture. In the negative electrode mixture, the mass ratio of artificial graphite, SBR, and CMC-Na was set to 100:1:1. The negative electrode slurry was applied to the surface of the copper foil, the

Comparative Example 3

The $CF_2$=$CH$—$O$—$CF_2$—$CF_2H$ used for the non-aqueous electrolyte in Example 7 was not used for the non-aqueous electrolyte. Except for this, a cell B3 was produced in the same manner as in Example 7.

(Battery Evaluation)

(Charge/Discharge Cycle Characteristics)

The cell for evaluation was subjected to constant current charging at a current of 0.3 It until the voltage reached 4.1 V under a 25° C. temperature environment, and thereafter subjected to constant voltage charging at a constant voltage of 4.1 V until the electric current reached 0.05 It. Then, the cell was subjected to constant current discharging at a current of 0.3 It until the voltage reached 2.5 V. This charge/discharge cycle was repeated 20 cycles. The ratio of the discharge capacity relative to the charging capacity at the 2nd cycle and the 20th cycle was determined as a charge/discharge efficiency ($R_{2cyc}$, $R_{20cyc}$). Table 1 shows the results.

TABLE 1

| | Fluorinated vinylene ether compound A | | Ether compound X | Positive | Negative | Charge/discharge efficiency | |
|---|---|---|---|---|---|---|---|
| | Type | Concentration | Type | electrode | electrode | $R_{2\ cyc}$ | $R_{20\ cyc}$ |
| Cell A1 | $CF_2$=$CH$—$O$—$CF_2$—$CF_2H$ | 50 | DME | NCA | Li Metal | 99.594 | 99.813 |
| Cell A2 | $CF_2$=$CH$—$O$—$CF_2$—$CF_2H$ | 100 | DME | NCA | Li Metal | 99.573 | 99.639 |
| Cell A3 | $CF_2$=$CH$—$O$—$CF_2$—$CF_2H$ | 250 | DME | NCA | Li Metal | 99.54 | 99.60 |
| Cell A4 | $CF_2$=$CH$—$O$—$CF_2$—$CF_2H$ | 1000 | DME | NCA | Li Metal | 99.518 | 99.522 |
| Cell A5 | $CF_2$=$CH$—$O$—$CF_2$—$CF_2H$ | 50 | HFE | NCA | Li Metal | 99.61 | 99.85 |
| Cell A6 | $CF_2H$—$CF$=$CH$—$O$—$CF_2$—$CF_2H$ | 50 | DME | NCA | Li Metal | 99.53 | 99.58 |
| Cell A7 | $CF_2$=$CH$—$O$—$CF_2$—$CF_2H$ | 50 | DME | NCA | Graphite | 99.75 | 99.81 |
| Cell A8 | $CF_2$=$CH$—$O$—$CF_2$—$CF_2H$ | 50 | DME | NCM | Li Metal | 99.55 | 99.63 |
| Cell B1 | | | DME | NCA | Li Metal | 99.513 | 99.458 |
| Cell B2 | | | HFE | NCA | Li Metal | 99.53 | 99.56 |
| Cell B3 | | 50 | DME | NCA | Graphite | 99.37 | 99.59 | coating was dried and then rolled, thereby producing a laminate in which the negative electrode mixture layer was formed on both sides of the copper foil. The laminate was cut into a predetermined size, thereby producing a negative electrode. Except for this, a cell A7 was produced in the same manner as in Example 1.

Example 8

The composition of the positive electrode active material particles used in the positive electrode in Example 1 was changed to $LiNi_{0.5}Co_{0.2}Mn_{0.3}O_2$. Except for this, a cell A8 was produced in the same manner as in Example 1.

Comparative Example 1

The $CF_2$=$CH$—$O$—$CF_2$—$CF_2H$ used for the non-aqueous electrolyte in Example 1 was not used for the non-aqueous electrolyte. Except for this, a cell B1 was produced in the same manner as in Example 1.

Comparative Example 2

The $CF_2$=$CH$—$O$—$CF_2$—$CF_2H$ used for the non-aqueous electrolyte in Example 5 was not used for the non-aqueous electrolyte. Except for this, a cell B2 was produced in the same manner as in Example 5.

Table 1 shows that, with comparison between Examples 1,7 and Comparative Examples 1,2,3, when the non-aqueous electrolyte contains the fluorinated vinylene ether compound A, the charge/discharge efficiency at the 2nd cycle and the 20th cycle significantly improved. Comparison between Example 1 and Example 8 showed that when the Ni ratio to a total number of moles of metal elements excluding Li is 80 mol % or more in the lithium transition metal oxide of the positive electrode, the effects of improvement in charge/discharge efficiency are more prominent. Also, Example 1 and Example 5 show that when the saturated hydrofluoroether compound Z is included as the ether compound X, the charge/discharge efficiency improves significantly.

INDUSTRIAL APPLICABILITY

The present disclosure can be used for lithium secondary batteries.

The invention claimed is:

1. A lithium secondary battery comprising: a positive electrode, a negative electrode, a separator interposed between the positive electrode and the negative electrode, and a non-aqueous electrolyte, wherein
the non-aqueous electrolyte includes an oxalate complex lithium salt, $CF_2$=$CH$—$O$—CF2-CF2H as a fluorinated vinylene ether compound A having a —$CF$=$CH$—$O$— bond, and a non-aqueous solvent an amount of the fluorinated vinylene ether compound A included in the non-aqueous electrolyte is 10 ppm or more and 100 ppm or less relative to a total amount of the non-aqueous electrolyte, the non-aqueous solvent includes an ether compound different from the fluorinated vinylene ether compound A the ether compound includes an alkyl ether compound Y represented by $R_1(OCH_2CH_2)n-OR_2$, where, $R_1$ and $R_2$ are each an alkyl group with a number of carbon atoms of 1 to 5, n is an integer of 1 or more, or a saturated hydrofluoro ether compound Z represented by $(C_{x1}H_{y1}F_{z1})$—O—$(C_{x2}H_{y2}F_{z2})$, where, x1, x2, z1 is an integer of 1 or more, y1, y2, z2 is an integer of 0 or more, and x1+x2≤10, 1≤y1+y2, and the positive electrode includes a lithium transition metal oxide A having a Ni ratio relative to a total number of moles of metal elements excluding Li of 80 mol % or more.

2. The lithium secondary battery of claim 1, wherein in the non-aqueous electrolyte, a ratio of the ether compound X is 50 vol % or more.

3. The lithium secondary battery of claim 1, wherein in the negative electrode, lithium metal deposits during charging and the lithium metal dissolves into the non-aqueous electrolyte during discharging.

4. The lithium secondary battery of claim 1, wherein the oxalate complex lithium salt includes lithium difluorooxalateborate.

\* \* \* \* \*